US008353208B2

(12) United States Patent
Chu et al.

(10) Patent No.: US 8,353,208 B2
(45) Date of Patent: Jan. 15, 2013

(54) HOUSING MADE OF FIBER-REINFORCED PLASTIC

(75) Inventors: Anh Tuan Chu, Ludwigshafen (DE); Ralf Fesser, Weisenheim am Sand (DE)

(73) Assignee: Sensus Spectrum LLC, Raleigh, NC (US)

( * ) Notice: Subject to any disclaimer, the term of this patent is extended or adjusted under 35 U.S.C. 154(b) by 0 days.

(21) Appl. No.: 13/330,268

(22) Filed: Dec. 19, 2011

(65) Prior Publication Data
US 2012/0156409 A1 Jun. 21, 2012

Related U.S. Application Data

(63) Continuation of application No. PCT/EP2010/003265, filed on May 28, 2010.

(30) Foreign Application Priority Data

Jun. 17, 2009 (DE) .................... 20 2009 008 315 U

(51) Int. Cl.
*G01F 15/14* (2006.01)
(52) U.S. Cl. ................ 73/273; 73/238; 73/234; 73/431; 73/861.351; 428/35.7
(58) Field of Classification Search ............... 428/35.7; 73/273, 238, 234, 431, 861.351–861.357, 73/861.42–861.69
See application file for complete search history.

(56) References Cited

U.S. PATENT DOCUMENTS

| 3,104,583 | A | 9/1963 | Gasche |
| 6,588,447 | B1 * | 7/2003 | Hendey .................... 137/315.06 |
| 7,541,188 | B2 * | 6/2009 | Conrad et al. ................ 435/404 |
| 8,006,569 | B2 * | 8/2011 | Gogge et al. ............... 73/861.12 |
| 8,047,072 | B2 * | 11/2011 | Ball et al. ......................... 73/201 |
| 2012/0156409 | A1 * | 6/2012 | Chu et al. ..................... 428/35.7 |

FOREIGN PATENT DOCUMENTS

| DE | 35 42 433 A1 | 6/1987 |
| DE | 102 38 416 A1 | 3/2004 |
| DE | 20 2005 017 576 U1 | 3/2006 |
| DE | 10 2006 045 325 A1 | 4/2008 |
| WO | WO 2004/022917 A1 | 3/2004 |

* cited by examiner

*Primary Examiner* — N. Edwards
(74) *Attorney, Agent, or Firm* — Muncy, Geissler, Olds & Lowe, PLLC

(57) ABSTRACT

Plastic housings that are subjected to internal pressure and comprise a housing upper part, a housing lower part and a closure which connects both parts to one another. At the connecting point, the housing upper and lower part have a plurality of comb-like retaining columns shaped in a complementary manner with respect to one another such that the housing parts can be plugged together. The retaining columns are oriented in a direction in which tensile force between the housing upper part and the housing lower part is oriented when the housing is subjected to internal pressure. Retaining grooves which are oriented transversely to the effective direction of the tensile force are formed in two opposite surfaces of the retaining columns in each case. Retaining bodies which at least partially touch the areas formed by the retaining grooves and thus establish the connection can be introduced into the retaining grooves.

17 Claims, 4 Drawing Sheets

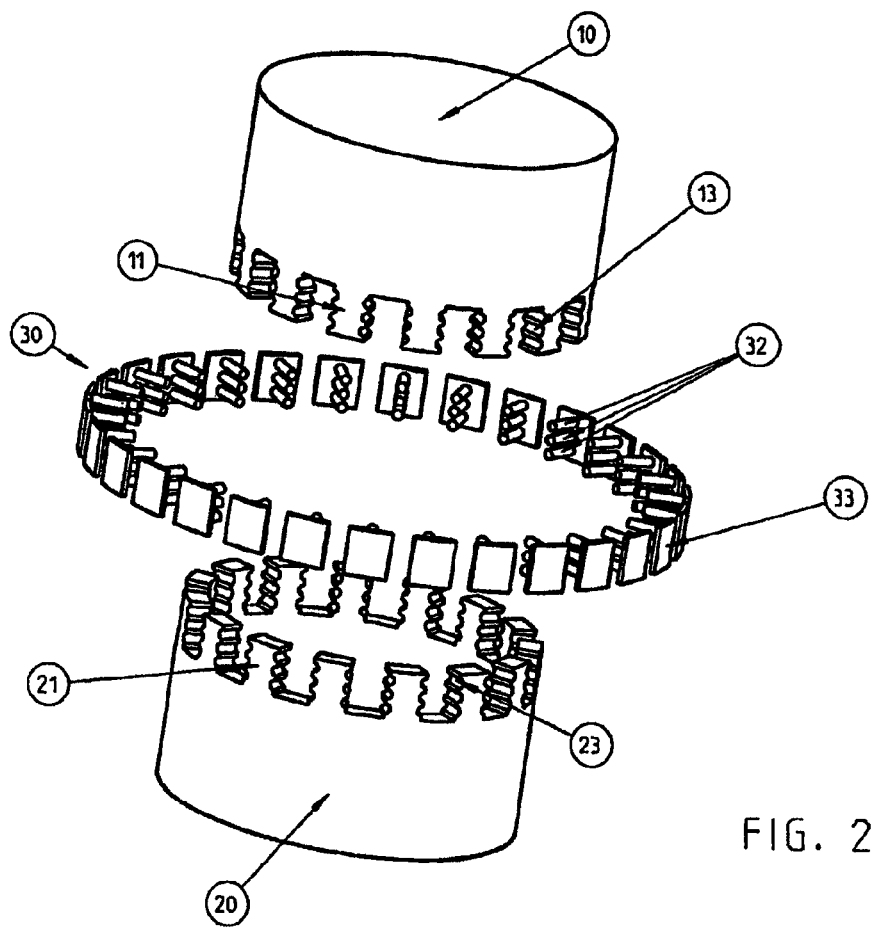
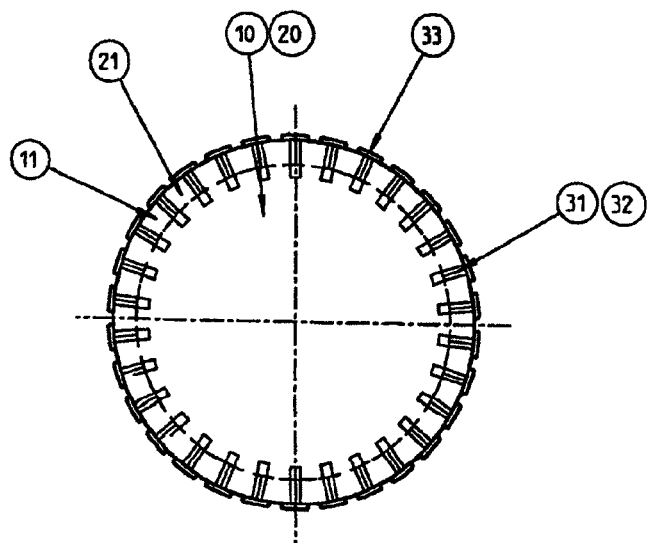
FIG. 2
FIG. 3

HOUSING MADE OF FIBER-REINFORCED PLASTIC

This nonprovisional application is a continuation of International Application No. PCT/EP2010/003265, which was filed on May 28, 2010, and which claims priority to German Patent Application No. DE 20 2009 008 315.2, which was filed in Germany on Jun. 17, 2009, and which are both herein incorporated by reference.

BACKGROUND OF THE INVENTION

1. Field of the Invention

The invention relates to a plastic housing, which can be subjected to internal pressure, comprising an upper housing part, a lower housing part, and a closure that connects both housing parts to one another.

2. Description of the Background Art

German Offenlegungsschrift No. DE 102 38 416 A1 or German Utility Model No. DE 20 2005 017 576 U1 discloses fluid flow meters, which have a pressure-resistant plastic housing. The housing has an upper housing part and a lower housing part. Both have a circumferential, outwardly positioned flange. A two-part locking ring, overlapping both flanges and thereby connecting the housing parts to one another, has a U-shaped cross section and connects the upper housing part and lower housing part together in a tension-resistant manner.

Experience has shown that this construction has two basic weak points. The first weak point is the inner edge between the respective housing parts and its flange; the second weak point is the sharp inner edge between the locking ring base and the locking ring side wall. Because of the leverage effect under the influence of high internal pressure forces in the housing, bending moments occur, which can lead to crack formation and thereby to failure, when this is not prevented by appropriate oversizing of the wall thicknesses and the transition radii. This is unsatisfactory.

SUMMARY OF THE INVENTION

It is therefore an object of the present invention to provide a two-part plastic housing, which is suitable for high internal pressure and has a space- and material-saving and durable connection design.

The object is attained via a housing having an upper housing part and lower housing part at the connecting point have a plurality of comb-like retaining columns. the retaining columns at the upper housing part or lower housing part are shaped complementary to one another and mate together so that the housing parts can be plugged together. The retaining columns can be oriented in the direction in which the tensile force between the upper housing part and lower housing part is directed, when the housing is subjected to internal pressure. Retaining grooves, which are oriented transverse to the effective direction of the tensile force, are formed in two opposite surfaces of the retaining columns. Retaining bodies, which at least partially touch the surfaces formed by the retaining grooves, can be inserted in the retaining grooves.

The comb-shaped retaining columns of the invention, which can be plugged into one another, are subjected only to tension and not to bending, whereby the tensile stress exerted by the internal housing pressure in the direction perpendicular to the separating plane between the upper and lower housing part distributes itself thus over many retaining columns, so that the specific stress is reduced accordingly. The retaining bodies, e.g., retaining bolts, seated in the retaining grooves, are subjected only to shearing, and thus can be made of plastic with relatively small cross sections. The retaining bodies, i.e., the retaining bolts or retaining rings themselves are placed dimensionally stable in the retaining grooves or retaining holes and therefore cannot deform.

The major advantage of the inventive design, however, is that all retaining columns are stressed substantially simultaneously and uniformly by the introduction of forces on two opposite sides in each case; the corresponding moments are thereby compensated so that no resulting bending moments act on the retaining columns.

According to a first embodiment of the invention, the surfaces by which the tensile force is transmitted to the side are directed toward the middle of the housing, preferably radially.

The assembly of the retaining bolts can be simplified and made faster, when according to a second embodiment of the invention the surfaces by which the tensile force is transmitted to the side are oriented parallel in groups.

According to an embodiment of the invention, a plurality of retaining grooves is formed in at least one contact surface extending in the tensile direction. As a result, it is possible to distribute the tensile forces over a plurality of retaining bodies and/or retaining bolts.

To simplify the assembly of the retaining bodies and/or retaining bolts, a plurality of retaining bodies and/or retaining bolts can be connected by a connecting bar to form one or more assembly units.

According to an embodiment of the invention, the connecting bars of some assembly units have offset ends, which overlap the connecting bars of the other assembly units. In this way, some of the connecting bars block the other connecting bars from an unauthorized disassembly.

According to a third embodiment of the invention, all contact surfaces extending in the tensile direction are oriented parallel. This embodiment is especially suitable for housing with an oval or rectangular cross section.

According to a fourth embodiment of the invention, retaining grooves are formed in two radially opposite surfaces in each case of the retaining columns, whereby the retaining grooves of adjacent retaining columns align. Inner or outer retaining rings, which fill the retaining grooves at least partially, can be inserted in the retaining grooves.

Advantageously, the retaining grooves of adjacent retaining columns are complementary to form helical grooves, into which the helical retaining bodies can be screwed.

To prevent unauthorized disassembly of the retaining bodies, at least one of these has a device for inseparable anchoring to the housing.

Alternatively or in addition, at least one of the back bars can have a component for inseparable anchoring to the housing.

Alternatively or in addition, the back bars can be provided with a component that bring about an inseparable connection among one another.

The connection of the housing parts can occur not only with the aid of prefabricated retaining bodies. It is possible alternatively to create the retaining bolts by using a preferably rapidly hardening plastic directly in the retaining holes.

The embodiment of the invention of the connection of the two housing parts makes the housing particularly suitable for use in water consumption meters, particularly when these have a large cross section and/or are designed for high pressures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a purely schematic illustration of a first embodiment of the design for the tension-resistant connection of the upper housing part and lower housing part;

FIG. 3 shows a plan view of the fully assembled housing of FIG. 2;

DETAILED DESCRIPTION

Figure 1:
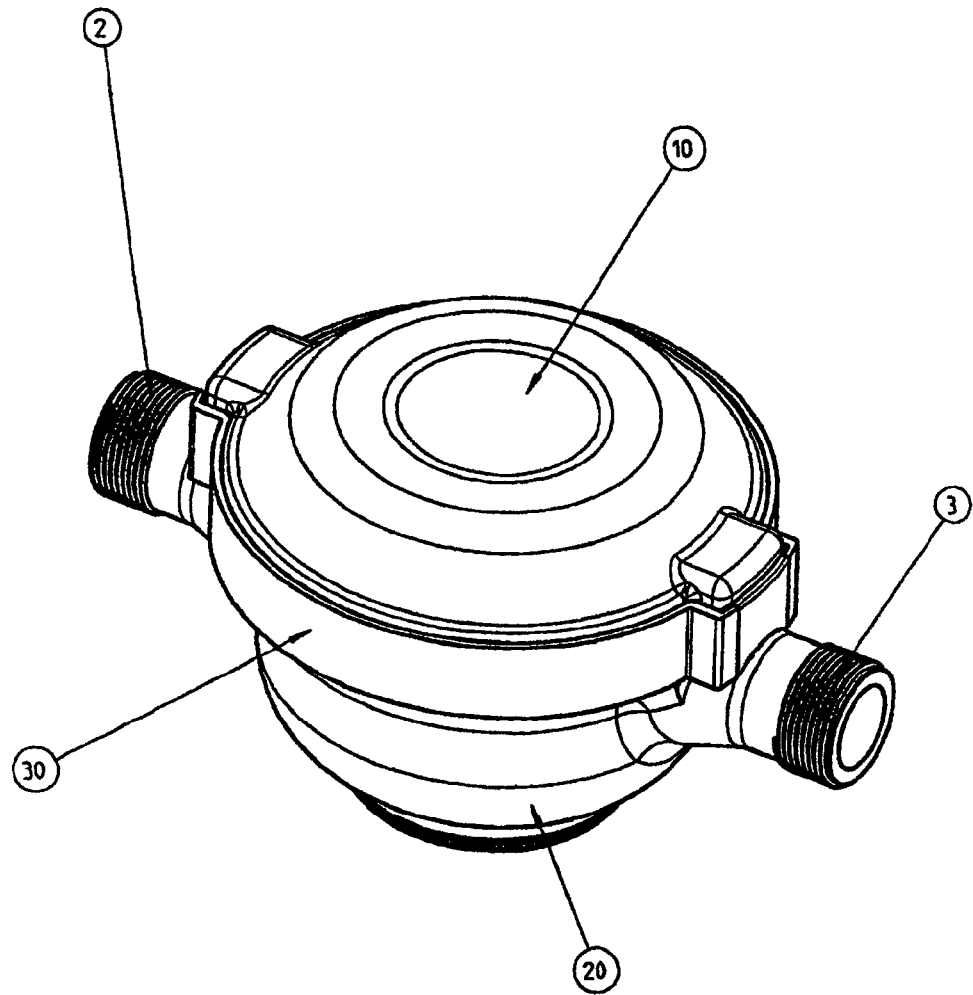
FIG. 1 shows an isometric illustration of a high-volume water meter with a housing made of fiber-reinforced plastic, which is dimensioned for high internal pressure.

FIG. 1 shows by way of example an isometric illustration of a water meter with a two-part housing made of fiber-reinforced plastic. The housing has an upper housing part 10, a lower housing part 20 with inlet and outlet connecting pieces 2, 3, and a closure 30 for connecting together upper housing part 10 and lower housing part 20 in a tension-resistant manner when internal pressure is present in the housing. The tensile forces to be absorbed by closure 30 are generated by the internal pressure of the water flowing through the water meter, multiplied by the cross-sectional area of the housing.

FIG. 2 shows in the form of an exploded view a purely schematic illustration of a first embodiment of the tension-resistant connection of the housing of FIG. 1. Evident are upper housing part 10, lower housing part 20, and closure 30. In the connection area, upper housing part 10 and lower housing part 20 have comb-shaped retaining columns 11, 21. Retaining columns 11, 21 are offset to one another and aligned to one another so that the two housing parts 10, 20 can be plugged together virtually without any gaps. Retaining grooves 13, 23, which are complementary to form retaining hollow spaces 31 (FIG. 3), are formed transverse to the tensile force direction in the contact surfaces of retaining columns 11, 21. Said retaining hollow spaces 31 are cylindrical and oriented radially in the exemplary embodiment of FIGS. 2 and 3.

The tension-resistant connection of the upper and lower housing part 10, 20 occurs with the aid of retaining bolts 32, which are inserted in retaining hollow spaces 31. To simplify the assembly, retaining bolts 32, arranged one above the other in the tensile force direction, are each connected with the aid of a connecting bar 33 to form an assembly unit.

FIG. 3 shows a plan view of the fully assembled housing of FIG. 2. A plurality of retaining bolts 32 are located distributed uniformly at the circumference in retaining hollow spaces 31, so that the tensile force formed by the internal pressure in housing 10, 20 is distributed over the accordingly many retaining bolts 32. Furthermore, it is evident that the forces, exerted by retaining bolts 32 on the particular retaining columns 11, 21 and directed in the circumferential direction, are compensated on the right and left of the respective retaining columns 11, 21, so that no resulting bending forces are exerted on retaining columns 11, 21.

Figure 4:
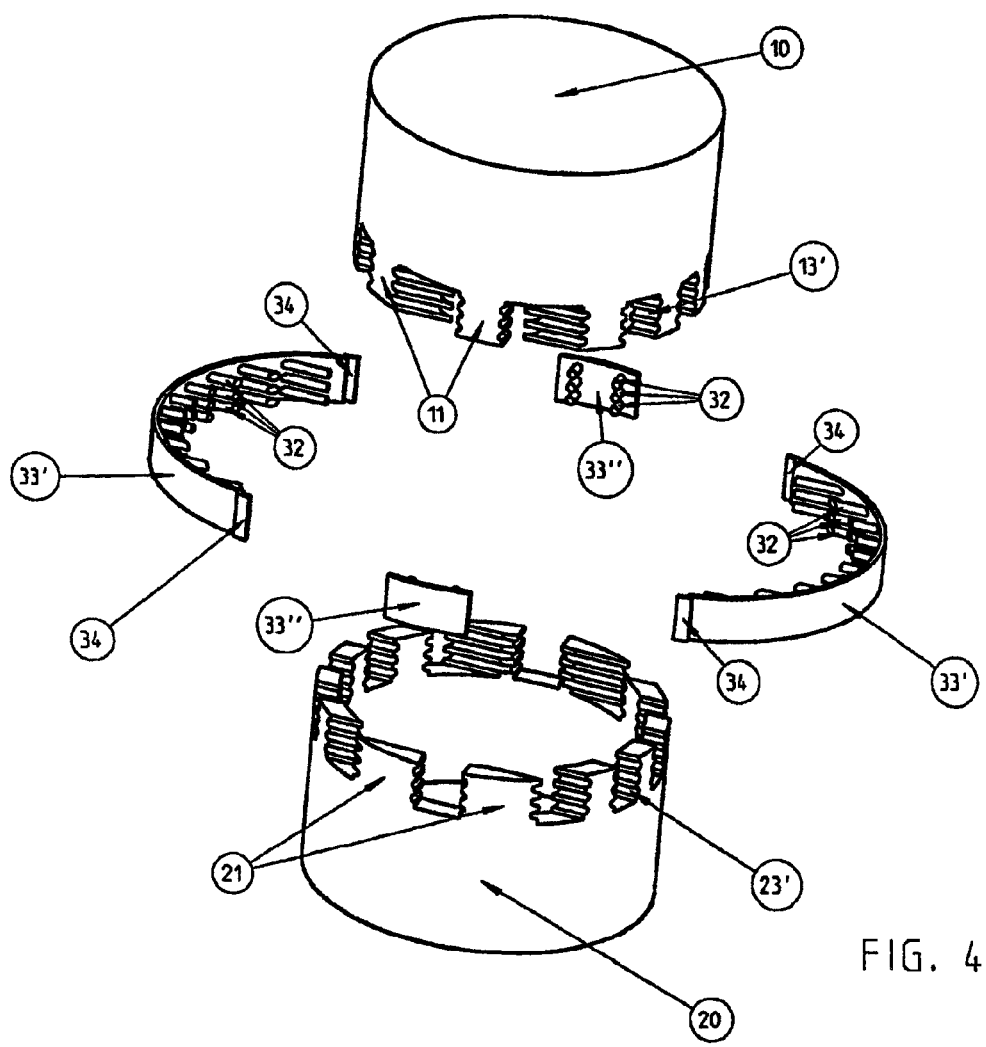
FIG. 4 shows a purely schematic illustration of a second embodiment of the tension-resistant connection between the upper housing part and lower housing part.

FIG. 4 shows a second closure design also as an exploded view and purely schematically. Here, the contact surfaces, extending in the tensile force direction, of upper housing part 10 and lower housing part 20 are oriented parallel in groups. Overall, four groups are evident, two large parallel groups on the right and left and two narrow parallel groups in the front and back. Retaining bolts 32 are combined with the aid of long and short connecting bars 33', 33" into groups to form assembly units, as a result of which the assembly time for the second exemplary embodiment can be considerably reduced compared with the assembly time for the first exemplary embodiment.

Furthermore, it is evident that the long connecting bars 33' of some assembly units have offset ends 34, which overlap the short assembly bars 33" of the other assembly units. The short connecting bars 33" are thus secured against unauthorized loosening.

Figure 5:
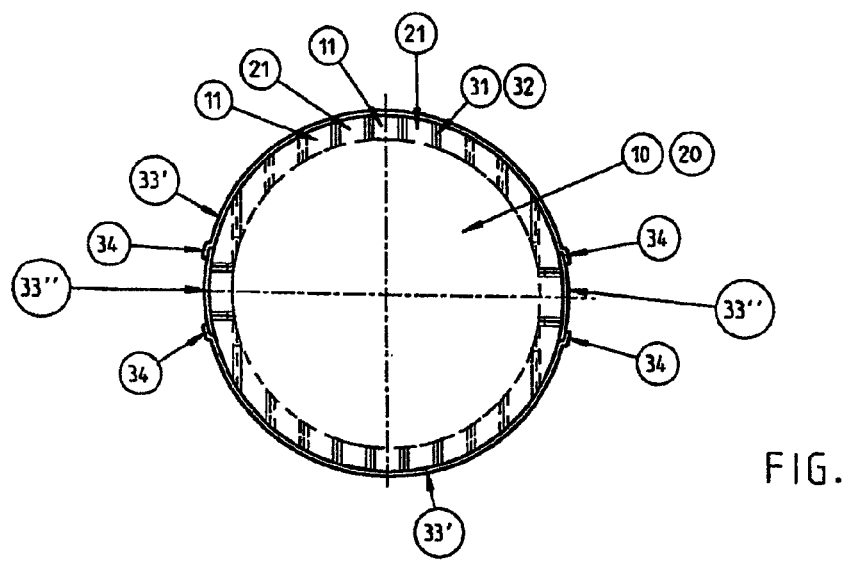
FIG. 5 shows a plan view of the fully assembled housing of FIG. 4.

FIG. 5 shows as a plan view the fully assembled housing of FIG. 4. Evident is the overlapping of the short connecting bars 33" by the offset ends 34 of the long connecting bars 33'.

To prevent unauthorized opening of the housing, retaining bolts 32 or connecting bars 33, 33', 33" can be secured by means of a security seal. Alternatively or also in addition, it is possible to provide at retaining bolts 32 and/or at connecting bars 33, 33', 33" a component for inseparable anchoring to the housing.

An alternative option for connecting the two housing parts 10, 20 together in a tension-resistant manner and simultaneously inseparably is to fill the retaining holes 31 with a preferably rapidly hardening plastic without using ready-to-use retaining bolts 32.

Figure 6:
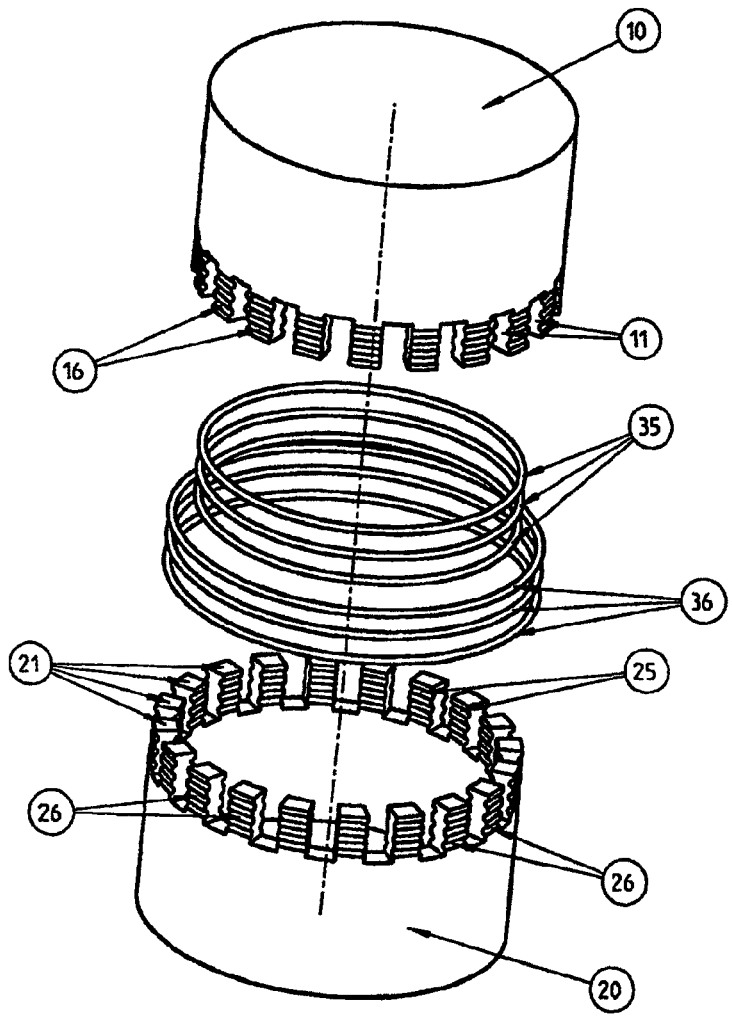
FIG. 6 shows a purely schematic illustration of a third embodiment of the tension-resistant connection between the upper housing part and lower housing part.

FIG. 6 shows a third closure design also as an exploded view and purely schematically. Here, retaining grooves 16, 25, 26 are formed in the radially opposing surfaces of the retaining columns 11, 21; said grooves which form closed annular grooves, as soon as the upper and lower housing parts 10, 20 are joined together. The tension-resistant connection is brought about by inner or outer retaining rings 35, 36, which are mounted in retaining grooves 16, 25, 26.

Figure 7:
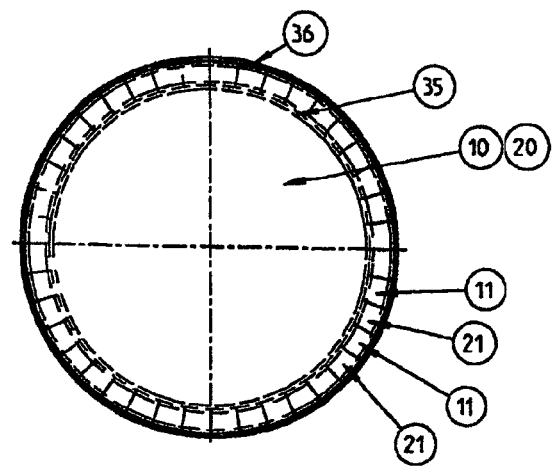
FIG. 7 shows a plan view of the fully assembled housing of FIG. 6.

FIG. 7 shows the fully assembled housing of FIG. 4 as a plan view. Retaining columns 11, 21 touch each other without any gaps and retaining rings 35, 36 lie within the annular grooves.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plastic housing that can be subjected to internal pressure, the plastic housing comprising:
   an upper housing part;
   a lower housing part; and
   a closure, which connects the upper housing part to the lower housing part;

wherein the upper housing part and lower housing part at a connecting point have a plurality of comb-like retaining columns, wherein the retaining columns at the upper housing part or lower housing part are shaped complementary to one another and mate together so that the housing parts are configured to be plugged together, wherein the retaining columns are oriented in a direction in which a tensile force between the upper housing part and lower housing part is directed, when the housing is subjected to internal pressure, wherein retaining grooves, which are oriented transverse to the effective direction of the tensile force, are formed in two opposite surfaces of the retaining columns, and wherein retaining bodies, which at least partially touch the surfaces formed by the retaining grooves, are insertable in the retaining grooves.

2. The housing according to claim 1, wherein, in each case two surfaces of adjacent retaining columns touch each other, wherein retaining grooves are formed in the contact surfaces of the retaining columns, and wherein the retaining grooves form into retaining hollow spaces.

3. The housing according to claim 2, wherein the retaining hollow spaces are cylindrical, and wherein retaining cylinders are insertable in the retaining hollow spaces.

4. The housing according to claim 2, wherein the retaining hollow spaces are circular cylindrical and wherein retaining bolts are insertable in the retaining hollow spaces.

5. The housing according to claim 1, wherein the contact surfaces extending in the tensile direction are oriented radially.

6. The housing according to claim 1, wherein the contact surfaces, extending in the tensile force direction, are oriented parallel in groups.

7. The housing according to claim 1, wherein a plurality of retaining grooves is formed in at least one contact surface extending in a tensile force direction.

8. The housing according to claim 1, wherein a plurality of retaining bodies is connected via connecting bars to form assembly units.

9. The housing according to claim 8, wherein the connecting bars of some assembly units have offset ends, which overlap the connecting bars of the other assembly unit.

10. The housing according to claim 1, wherein all contact surfaces extending in the tensile force direction are oriented parallel.

11. The housing according to claim 1, wherein at least one of the retaining bodies has a component for inseparable anchoring to the housing.

12. The housing according to claim 1, wherein at least one of the back bars has a component for inseparable anchoring to the housing.

13. The housing according to claim 8, wherein the back bars have a component for the inseparable mutual connection.

14. The housing according to claim 1, wherein the retaining bodies are formed by a rapidly hardening plastic.

15. The housing according to claim 1, wherein the retaining grooves are formed in two radially opposite surfaces in each case of the retaining columns, wherein the retaining grooves of adjacent retaining columns align, and wherein inner or outer retaining rings, which fill the retaining grooves at least partially, are insertable in the retaining grooves.

16. The housing according to claim 15, wherein the retaining grooves of adjacent retaining columns will form into helical grooves, and wherein the inner or outer retaining rings are designed as coils.

17. The housing according to claim 1, wherein the housing is a housing for a water consumption meter.

* * * * *